Jan. 12, 1954     E. J. MARCOUILLER     2,665,617
CAMERA FOR TAKING PHOTOGRAPHS OF BODY CAVITIES
Filed Sept. 7, 1950                    4 Sheets-Sheet 1

INVENTOR.
ERNEST F. MARCOUILLER
BY
Michael S. [signature]

Jan. 12, 1954 E. J. MARCOUILLER 2,665,617
CAMERA FOR TAKING PHOTOGRAPHS OF BODY CAVITIES
Filed Sept. 7, 1950 4 Sheets-Sheet 2

INVENTOR.
ERNEST F. MARCOUILLER
BY
Michael E. ...
agt

Jan. 12, 1954 E. J. MARCOUILLER 2,665,617
CAMERA FOR TAKING PHOTOGRAPHS OF BODY CAVITIES
Filed Sept. 7, 1950 4 Sheets-Sheet 3

INVENTOR.
ERNEST F. MARCOUILLER
BY
Michael [signature]

Jan. 12, 1954 E. J. MARCOUILLER 2,665,617
CAMERA FOR TAKING PHOTOGRAPHS OF BODY CAVITIES
Filed Sept. 7, 1950 4 Sheets-Sheet 4
FIG.10.
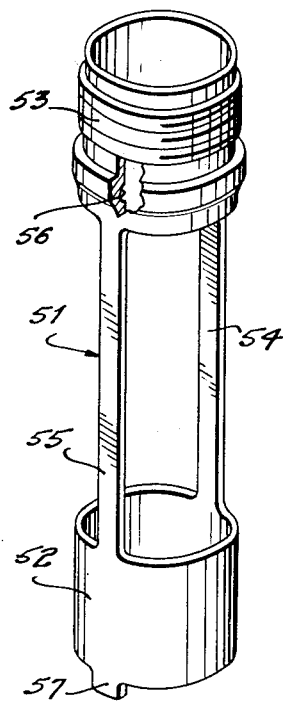
FIG.11.
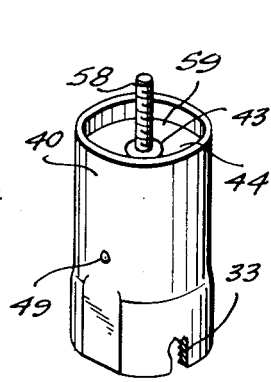
FIG.12.
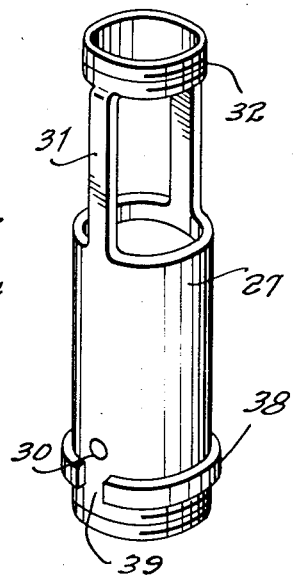
FIG.9.
FIG.13.
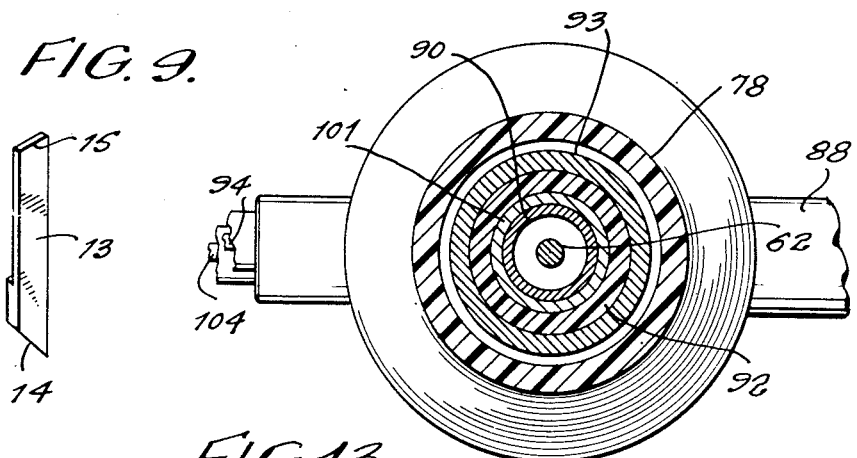
INVENTOR.
ERNEST F. MARCOUILLER
BY Michael [signature]

Patented Jan. 12, 1954

2,665,617

UNITED STATES PATENT OFFICE 2,665,617

CAMERA FOR TAKING PHOTOGRAPHS OF BODY CAVITIES

Ernest J. Marcouiller, New York, N. Y.

Application September 7, 1950, Serial No. 183,608

5 Claims. (Cl. 95—11)

My present invention relates to apparatus for taking photographs of body cavities.

One of the objects of my present invention is to provide a device adapted to be located within the body cavities and having various cameras mounted thereon to take pictures of the body cavity.

Another object of my invention is to mount a camera on the end of an elongated member which extends into the body cavity so that a picture may be taken along the longitudinal axis of the elongated member.

A further object of my present invention is to mount side cameras on the sides of the elongated member so as to be able to take pictures transversely to the longitudinal axis of the elongated member.

An additional object of my invention is to provide a device which is capable of simultaneously taking pictures both in the longitudinal direction of the elongated member and in a direction transverse to the elongated member.

It is a further object of my invention to provide a device for keeping the openings to the films in said cameras covered before and after the cameras are located within the body cavity, and to permit the removal of the cover over the openings of the cameras while the cameras are located within the body cavity.

Another object of my present invention is to permit the cameras to be removed from the parts which operate the cameras while the openings of the cameras remain covered so that the cameras and their film may be sent away to have the film developed without light contacting the film in the cameras.

With these objects in view, my present invention mainly relates to an appraratus for photographing cavities of the human body, comprising in combination, an elongated member, one end portion of which is adapted to be located at a position within said cavity, said elongated member carrying an end camera at the extremity of said end portion so as to permit the taking of a picture in the direction of the longitudinal axis of said elongated member, and carrying at least one additional side camera located along the side of said elongated member adjacent said extremity so as to permit the taking of a picture in a direction transverse to the longitudinal axis of said elongated member; and means for producing a momentary flash of light within said cavity, whereby said cameras may take said pictures of said cavity.

More particularly, my present invention relates to an apparatus for photographing cavities of the human body, comprising in combination, an end camera having an opening which communicates light to a film holder mounted therein and having a pivoted shutter member mounted therein to be moved to positions for opening and closing said opening, a leaf spring member mounted in said end camera and operatively connected to said pivoted shutter member and tending to move said pivoted shutter member to said open position, said end camera comprising a longitudinal slot through one side thereof in which is mounted an elongated element having a bevelled end which is adapted to engage a shoulder on said pivoted shutter member and which is adapted to extend slightly from said end camera at one end thereof, said end camera being internally threaded and having threadedly connected to its film holder a film holder for a side camera; said side camera being threadedly connected to said threads in said end camera and said side camera comprising a slot adapted to receive an extension on said film holder of said side camera whereby said film holder is properly aligned with an opening through the wall of said side camera; a spring mounted above said film holder and bearing against a shelf which extends transversely across said camera; a pair of arms integral with said camera and extending upwardly therefrom and having an externally threaded cylindrical portion integral with the top thereof; a flash bulb located within said arms extending upwardly from said camera and resting on a spring connected to the side of said camera shelf distant from said film holder; said upper externally threaded cylindrical portion having threadedly connected thereto an additional element having a metallic electrical conducting element extending therethrough and engaging an electrode extending from said flash bulb and having spring pressed ball elements at the outer surface thereof; a shutter member slidably mounted on said additional element and said side camera member, having a pair of arms which are in alignment with the arms extending upwardly from said side camera and having a lower cylindrical portion adapted to cover the opening through said side camera when said slidable shutter member is in its lowermost position and in contact with said end camera, said slidable shutter member comprising an extension which is in alignment with said slot in said end camera, said slidable shutter member in its lowermost position advancing said elongated element in said slot of said end camera so as to pivot the pivoted shutter member of said end camera into said closing position, said slidable shutter member having an internal groove adapted to be engaged by said spring pressed ball members of said additional element when said shutter member is in said lowermost position; operating means connected to said metallic element of said additional element and to said slidable shutter member to permit the shutter member to be moved with respect to the end camera, side camera, flash bulb and additional element so as to uncover the openings in the cameras; and means for providing electrical current for said flash bulb when said openings are uncovered and when the apparatus is located within a body cavity so as to create a momentary flash to enable the cameras to take a picture of the body cavity, said operating means then permitting said slidable shutter member to be moved back to its lowermost position so as to cover the opening of said side camera and said end camera, whereby the apparatus may be removed from the body cavity and the camera removed from the operating means without any light contacting the film.

It will be noted that the elongated member which is located within the body cavity itself forms part of the side cameras and additionally carries the end camera.

The novel features which I consider as characteristic for my invention are set forth in particular in the appended claims. The invention itself, however, both as to its construction and its method of operation, together with additional objects and advantages, will be best understood from the following description of specific embodiments when read in connection with the accompanying drawings, in which:

Fig. 1 is a view partly in section of the entire apparatus;

Fig. 2 is a sectional view of the camera construction with the shutters of the cameras covering the openings thereof;

Fig. 9 is a view of the elongated element which operates the shutter in the end camera and which is actuated by the shutter of the side cameras;

Fig. 10 is a view of the shutter element for the side cameras;

Fig. 11 is a view of the element which is connected to the top of the side camera casing;

Fig. 12 is a view of the outer casing of the side cameras; and

Fig. 13 is a sectional view taken on line 13—13 of Fig. 8 looking in the direction of the arrows.

Figure 3:
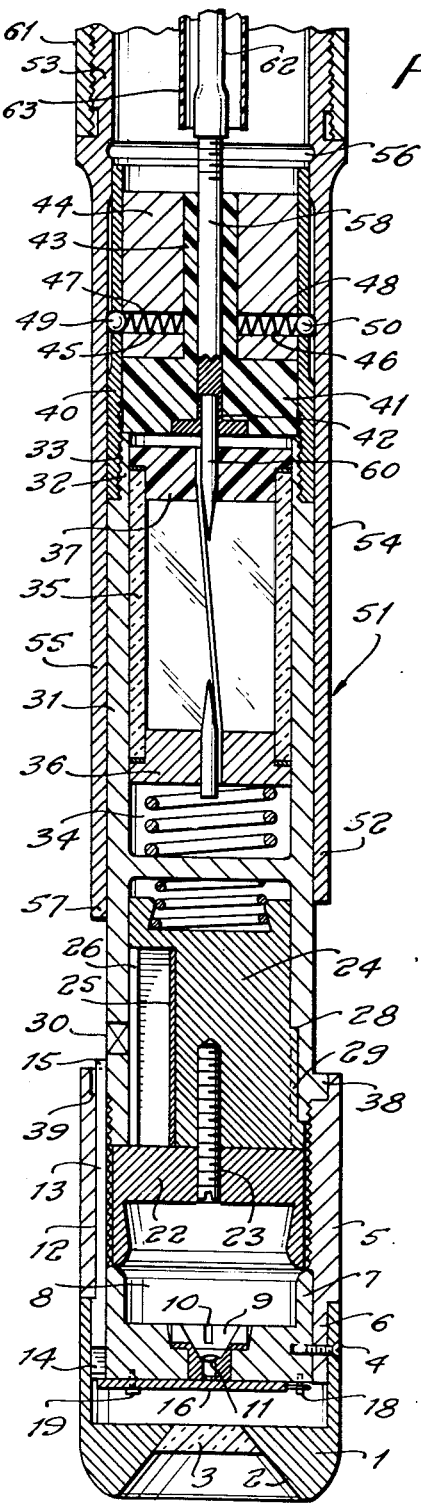
Fig 3 is a view similar to Fig. 2 with the shutters in the position where the openings to the films in the cameras are uncovered.

The end camera shown at the bottom of Fig. 2, comprises the end part 1 which has a curved front surface with an opening 2 therein, as shown in Fig. 2. The said opening 2 has a transparent glass element 3 fitted therein. Within the element 1 is fitted cylindrical member 5 having a reduced end portion 6 which slidingly fits within element 1.

Within element 5 is enclosed element 7 which supports various working parts of the camera. Element 7 has threaded openings extending in from its surface and screws 4 extend through elements 1, 5 and 7, thereby connecting all these elements together. Element 7 has a recess 8 at the end far from glass 3 and is bored and countersunk from recess 8 to the other side of element 7. Within this bore, which is threaded, is fitted threaded element 9 having grooves 10 to fit a screw driver for inserting it within the threaded bore of element 7.

Threaded element 9 is axially bored and within this bore is supported the lens 11. From the lens 11 to the head end of threaded element 9 is a conical recess converging towards lens 11 so that the light entering through opening 2 and glass 3 may be distributed by lens 11 over the surface of the film held in the camera as described below.

Figure 4:
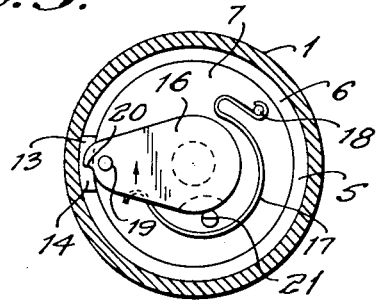
Fig. 4 is a sectional view taken on line 4—4 of Fig. 2 looking in the direction of the arrows.

Element 5 is internally threaded above element 7 and includes groove 12 which extends longitudinally of element 5, interrupting the threads thereof, and also extends through the side of element 7 and communicates with the space behind glass 3. Within this groove is located the trigger element 13 having a bevel end 14 located adjacent the lower end of the camera, as viewed in Fig. 2. The opposite end 15 of trigger element 13 is located adjacent the upper end of element 5 as viewed in Fig. 2. As shown in Fig. 4, there is pivotally mounted to the face of element 7 which is adjacent to glass 3 a shutter element 16. Also, fixed within the space between glass 3 and element 7 is a leaf spring 17, shown in Fig. 4, connected at one end to element 7, as shown at 18 and bearing at its other end against shutter element 16 so as to rotate the said shutter element in a counterclockwise direction about its pivot 19, as viewed in Fig. 4. Therefore, the tendency of leaf spring 17 is to move shutter element 16 to one side of the camera so that lens 11 will be uncovered.

To the left of pivot 19, as viewed in Fig. 4, shutter 16 comprises a shoulder 20 cut in from its periphery against which the beveled end 14 of trigger element 13 is adapted to bear. When a longitudinal force is applied to end 15 of element 13, the bevel end 14 of element 13 advances so that its inclined surface contacts shoulder 20 thereby pivoting shutter element 16 in a clockwise direction, as viewed in Fig. 4 against the action of spring 17 and thereby covering lens 11. Element 21 is a stop member which limits the clockwise movement of shutter element 16.

Figure 5:
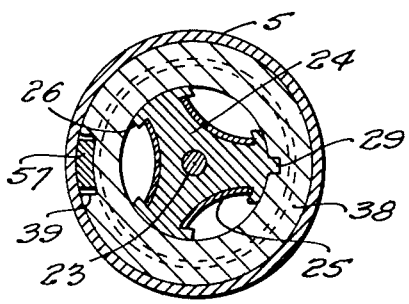
Fig. 5 is a sectional view taken on line 5—5 of Fig. 2 looking in the direction of the arrows.
Figure 6:
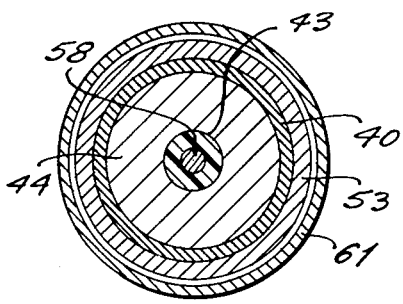
Fig. 6 is a sectional view taken on line 6—6 of Fig. 2 looking in the direction of the arrows.

Slidingly fitted within the inner cylindrical threaded portion of element 5 is film holder 22 which may be made of brass and to film holder 22 is connected by means of threaded member 23 another film holder 24, shown in plan view in Fig. 5.

As shown in Fig. 2, film holder 22 has its inner surface receding from the surrounding walls whereby the film may be held against this surface in the film holder without falling out. Film holder 24 may have a plurality of surfaces which are concave, as shown in Fig. 5, and against which the film 25 is placed. Although three such surfaces are shown in Fig. 5, it is to be understood that the camera may include a number of concave surfaces which is greater or less than that shown in Fig. 5. The inner longitudinal edges of the respective concave portions which hold film 25 comprise longitudinal abutments 26 which are adapted to hold the film fixed within the film holder 24. Over film holder 24 is fitted the camera body 27 which is externally threaded at its lower end so as to be connected with the upper internal threads of element 5 thereby fixing film holders 22 and 24 to the end and side cameras. Camera body 27 comprises a notch 28 extending longitudinally from its lower edge, and within this notch is adapted to fit an extension 29 on the outer edge of film holder 24 thereby aligning film holder 24 with the camera body 27 so that the openings 30 of camera body 27 will be properly aligned with the film in film holder 24. Openings 30 have jewels mounted therein, with a small hole passing through each of said jewels so as to permit the light to contact the film in film holder 24.

Above film holder 24, camera body 27 is cut away so that two longitudinal arms 31 extend from the lower cylindrical portion of the camera body 30 up to another cylindrical portion 32 located at the other end of camera body 27. Cylindrical portion 32 is externally threaded as at 33.

Fixedly mounted to the top of film holder 24 in a recess located in said top is a spring which bears against a shelf which passes across camera body 27, as shown in Fig. 2. On this shelf is mounted spring 34. Mounted on top of spring 34 within the two arms 31 of camera body 27 is the cylindrical flash bulb 35 having a metal end 36 which rests on spring 34 and having a plastic end 37 at the other end of the transparent cylindrical member which with the two ends encloses the flash material within the flash bulb.

Just above the threaded lower end of camera body 27 which meshes with the internally threaded upper end of element 5 is located a flange 38 which is cut away at 39 to accommodate longitudinal sliding movement of trigger element 13.

Threadedly connected to the top end of camera body 27 is cylindrical element 40 having internal threads at the lower end thereof adapted to threadedly connect with the threads 33 at the top of the camera body 27. Within element 40 is threaded plastic element 41 having a longitudinal bore 42 extending therethrough. About the extension 43 of plastic body 41 is located a cylindrical brass element 44 having horizontal bores 45 and 46 extending transversely through said element 44 and communicating with a longitudinal bore through element 44 within which bore the extension 43 of plastic element 41 slidingly fits. Within the horizontal bores 45 and 46 are located springs 47 and 48, respectively, which press at one end against the extension 43 of element 41 and press at their other end against ball elements 49 and 50, respectively, which are located in openings in element 40, these openings being of such a size that the ball elements extend slightly beyond the cylindrical surface of element 40.

Located about element 40 and camera body 27 is shutter element 51 which is cylindrical at its lower end 52 and its upper end 53 and has longitudinal arms 54 and 55 connecting said cylindrical portions 52 and 53. The upper cylindrical end 53 of shutter element 51 is externally threaded for a purpose which will be stated below and the inner cylindrical surface of portion 53 contains a groove 56 adapted to receive ball elements 49 and 50. Element 40 at its outer surface of its lower end comprises two flat portions adapted to fit within and next to the inside of the arms 54 and 55. When the camera body 27 is threadedly connected with element 40 the said flat portions on element 40 are adapted to be aligned with the arms 31 of camera body 27, and therefore, the arms 54 and 55 are aligned with the arms 31 of camera body 27. In alignment with arm 55 on shutter element 51 and located at the bottom edge thereof is an extension 57. The threaded connections between elements 5 and 27 and elements 27 and 40 at threaded portion 32 is such that the extension 57 which is in alignment with arm 55 is also aligned with end 15 of trigger element 13 which projects slightly through the opening 39 in flange 38 of camera body 27. Therefore, it is evident that when shutter member 51 is slidingly moved towards element 1 and abuts against flange 38 the extension 57 will extend through cut away portion 39 and will push trigger element 13, thereby advancing trigger element 13 and causing bevelled end 14 to turn shutter element 16 to the position shown in Fig. 4.

The construction is such that spring 17 is strong enough to turn shutter element 16 in a counter-clockwise direction as viewed in Fig. 4, and thereby depress trigger element 13 so as to push shutter element 51 away from element 1. It will be noted that the movement of shutter element 51 from the position shown in Fig. 3 to the position shown in Fig. 2 closes the openings 30 in camera body element 27 and simultaneously through trigger element 13 and shutter element 16 closes the light path through opening 2. As will be explained below this is done after the flashing of light within the cavity of the body and it is necessary to provide a means acting against spring 17, for holding the shutter element 51 over the openings 30 and shutter element 16 over the opening 2 in order to prevent light from getting at the films before they are developed. This means is provided by ball elements 49 and 50 resting in groove 56 of shutter element 51, these springs 47 and 48 in conjunction with ball elements 49 and 50 resting in groove 56 are strong enough to hold the shutter element in its lower position, as seen in Fig. 2, against the action of spring 17 and wherein the lower cylindrical portion 52 of shutter element 51 covers the openings 30 of camera body 27 and wherein the extension 57 on shutter element 51 bears against end 15 of trigger element 13 so that the bevelled end 14 maintains the shutter element 16 in the position shown in Fig. 4.

Within the plastic element 41 is a longitudinal bore 42, as mentioned above, and a countersunk portion of polygonal cross section at the lower end thereof within which is fitted the metallic element 58, the lower end of metallic element 58 having a polygonal cross section adapted to fit in the polygonal cross section of the counterbore so as to prevent relative rotation between elements 41 and 58. As shown in Fig. 2, the upper end of element 58 is threaded and over this threaded portion is fitted a plastic cover 59 for element 40 having a portion of reduced diameter which fits within the inner cylindrical portion of element 40. The lower end of element 58 has a small bore therein adapted to make electrical contact with electrode 60 extending through the plastic end of the flash bulb and connected to the flash material of the bulb so as to enable electric current to be transmitted thereto to create a light within the cavity of the body.

At the top of Fig. 2 are shown elements which are connected to the camera so as to operate it. Element 61 is adapted to threadedly engage the top end 53 of shutter element 51 and element 62 is adapted to threadedly engage the top end of element 58. These parts are so constructed that elements 58 and 53 may be simultaneously threaded to elements 62 and 61, respectively.

The operation of the camera as thus far described is as follows: Means to be described below permit relative longitudinal movement of elements 62 and 61 which relative longitudinal movement is communicated to elements 51 and 58 by the above mentioned threaded connections. Assuming that element 61 and shutter element 51 remain in the position shown in Fig. 2 and that element 62 is moved downwardly so as to move ball elements 49 and 50 out of groove 56 and thereby move the lower end of the camera away from the lower cylindrical portion 52 of shutter element 51 so as to uncover openings 30 and so that the spring 17 is free to push back shutter 16 to permit light to enter through lens 11 to the film on film holder 22, this longitudinal movement is limited by means to be described below so that it stops after the openings 30 are fully uncovered. At the end of this movement, through a connection to be described below electrical current is sent through the flash bulb 35 causing its flash material to become ignited and create a momentary flash in the cavity of the body which escapes through the transparent enclosure of the flash bulb element 35. Since the inner cavity of the body is dark this momentary flash is sufficient to cause a picture of the internal cavity of the body to be taken on the various films located in film holders 24 and 22. Through a means to be described below, element 62 is moved back to the position shown in Fig. 2, and ball elements 49 and 50 engage groove 56 in shutter element 51 so that the openings 30 will remain covered and so that the spring 17 will not be able to push back the shutter element 16. The camera may then be detached from elements 61 and 62 by unscrewing the camera at its threaded connections to said elements. The camera may then be sent away for the films to be developed and the ball elements and groove 56 will hold the shutter element 51 in place so that no light can get to the films in film holders 24 and 22.

Figure 7:
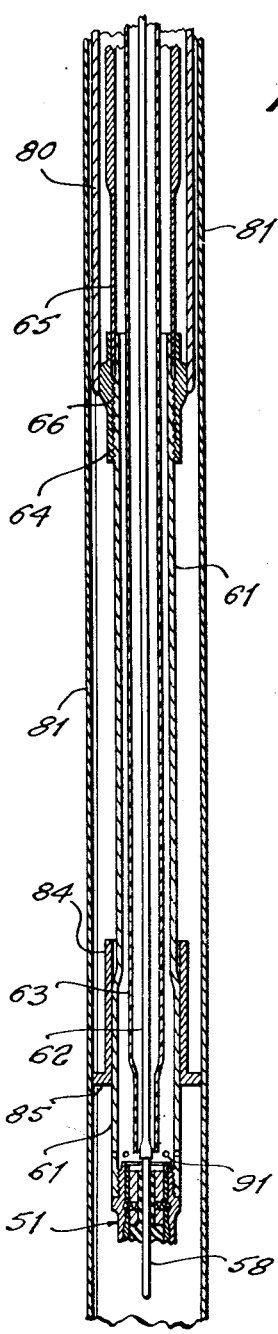
Fig. 7 is a sectional view taken through the lower part of the mechanism for operating the cameras.

The following is a description of the means for operating the camera. Element 61 is shown in Fig. 7 extending upwardly from its threaded connection to shutter element 51. Also element 62 is shown in Fig. 7 extending upwardly from the threaded connection to element 58. Located between elements 61 and 62 is a plastic tubular element 63. Element 61 is externally threaded at its upper end as shown at 64 and is connected to element 65 by threaded coupling element 66 having a slight enlargement at the upper end thereof, as shown in Fig. 7. Element 65 is externally threaded at its upper end, as shown at 77 in Fig. 8, and connects with metal coupling element 79 which fits within the plastic handle portion 78 which is threaded internally at its lower end to receive element 79. Element 79 has a flange which fits just below the handle portion 78, and element 79 is threaded just below this flange to receive element 80 which is threaded internally and which is adapted to slidingly fit over the enlargement on the coupling member 66 mentioned above. Element 80 is of a suitable outer diameter to slidingly receive thereon element 81 having a curved outwardly extending flange 82 adjacent the upper end thereof and being adapted to slidingly and snugly fit on element 80 until the upper end of element 81 comes in contact with shoulder 83 on element 80. Element 81 is of a smooth exterior portion so that the said element 80 may be advanced into the internal cavity within the body and various parts of the device are moved within element 81 so as not to injure the membranes of the body. Slidingly and snugly fitted on the lower end of element 61 is a cylindrical member 84 having a surface 85 which faces towards the lower open end of element 81, this element 84 being of a shiny exterior. The arrangement is such that when element 62 is moved with respect to element 61 by means to be described below the camera moves forward from the lower end of element 81, as shown in Fig. 1, the openings in the camera extend from beneath shutter member 51 and the shutter element 16 is free to uncover the end camera under the influence of spring 17. Just at the instant of the end of the longitudinal movement of the camera out of element 81 the flash bulb 35 flashes its light which is reflected within element 81 against the above mentioned surface 85 so that the light is directed forwardly out of element 81 in order to properly and momentarily light up the internal cavity. As shown in Fig. 1, element 84 is slotted at portions 86 towards its upper end so that the element 84 snugly fits on the lower portion of element 61, whereby it may be slidably adjusted thereon.

Within the handle portion 78 is fixedly located a sleeve member 87 of plastic material within which is threadedly mounted the element 88 extending through a bore in the side of handle 78. Element 88 is bored longitudinally as shown at 89 and opens into cylindrical metallic element 101 to the lower end of which is attached the top end of plastic member 63 which, as was mentioned above, is located between element 62 and 61. Element 88 is adapted to have an air connection attached thereto whereby air may be admitted through the bore 89 in element 88 and down through the element 101 and plastic element 63 to escape through openings 91 in element 61, as shown in Fig. 2, and along element 81 out into the interior of the body cavity. It is found that a better picture is taken when the body cavity is blown up with air.

Figure 8:
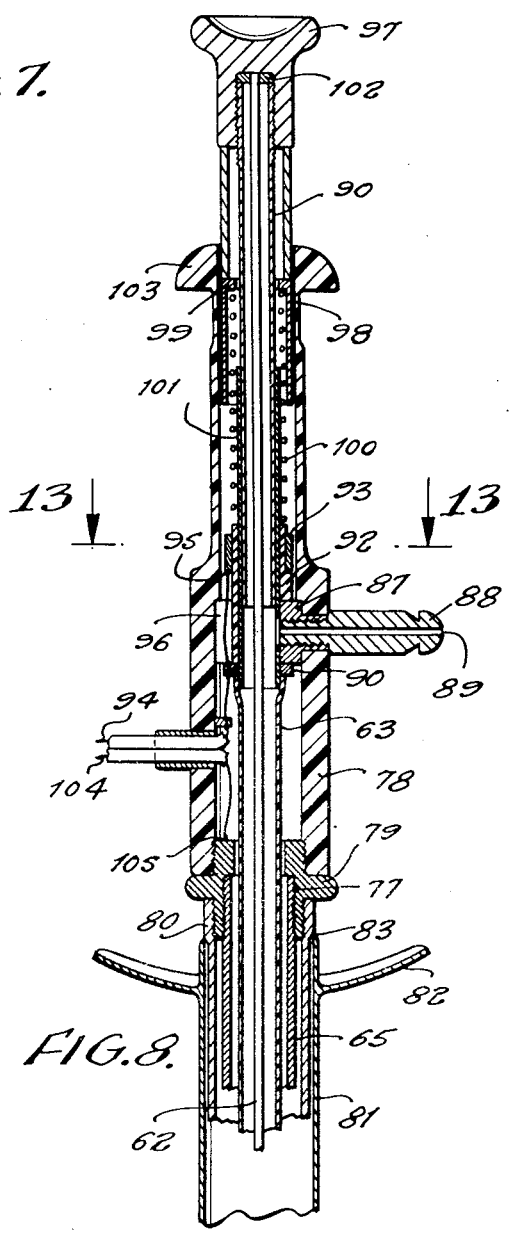
Fig. 8 is a sectional view taken through the upper part of the mechanism for operating the cameras.

On the fixedly mounted plastic member 87 is fixedly mounted another plastic member 92 which supports a metal member 93 to which wire 94 is electrically connected at 95, wire 94 passing through an opening 96 which extends through the side of element 87 distant from its threaded connection to element 88. As is shown in Fig. 8, the plastic supporting member 92 extends beyond the upper edge of cylindrical element 93. Fixedly located within said supporting member 92 is the metal element 101 which, as was mentioned above, is connected to the plastic element 63.

Fixedly connected to the control element 97 is a metal sleeve member 98 which has a flange located internally thereof at 99, against the lower side of which the metal spring 100 bears. Spring 100 decreases in diameter from its top towards its bottom and the lower end of spring 100 bears on the top of plastic element 92 and at its lower end snugly grips the metal element 101, as shown in Fig. 8. Slidably mounted within element 101 is the metal element 90 which is threadedly connected to plastic control element 97. At the innermost portion of the bore in element 97 is located a metal element 102 to which is rigidly connected element 62 and against which the threaded element 90 abuts. Sleeve 98 is adapted to slidingly fit within the upper portion of handle 78 which has a flange 103 to accommodate the fingers of the operator, whereby the thumb may contact the upper depression in operating element 97 to bring element 97 closer to element 103. Connected to element 79 is the wire 104, the said connection being at 105, as shown in Fig. 8.

The following is the operation of the above described apparatus, assuming that the camera described in the early part of the application is attached to the operating members, as shown in the upper portion of Fig. 2. Assuming that the end of element 31 is located in the body cavity, the operator grasps element 103 and depresses element 97 against spring 100 and element 62 which is attached to element 58, as shown in Fig. 2, causes through said movement the shifting of the camera with respect to shutter element 51 so as to uncover the openings of the camera as described above. As is evident from Fig. 8, the downward movement of element 97 is limited by the lower end of element 92 coming in contact with the upper end of element 93. It is therefore seen that this limit of the movement of element 99 serves to complete the circuit through flash bulb 35 so as to cause a momentary flash of light within the body cavity at the moment when the end of the camera is furthest away from shutter element 51 and when the openings of the camera are therefore completely uncovered. The electrical path is through lead 94 which is connected at 95 to element 93 and then along element 98 which has come in contact with element 93 by the downward movement of element 97. The current then flows along the flange 99 and through spring 100 to cylindrical member 101 which is in contact with sliding member 90 so that the current flows to sliding member 90, up to element 102 at the innermost portion of the bore 97, to shaft 62, which is threadedly and electrically connected to shaft 58, shown in Fig. 2, and from shaft 58 through portion 60 of the flash bulb 35 which extends through plastic element 37, through the flash material in the flash bulb to the metal end 36 of the flash bulb, to the spring 34 which is connected to the shelf of camera body 27, from said shelf through the camera body 27, through element 40 to the shutter element 51, from the shutter element 51 to element 61 which is connected by means of coupling 66 to element 65 which is threadedly connected in the metal flange 79 to the upper end of which is connected the lead 104 at the point of 105.

It will be understood that each of the elements described above, or two or more together, may also find a useful application in types of photographic apparatus differing from the types described above.

While I have illustrated and described the invention as embodied in an apparatus for photographing cavities of the human body, I do not intend to be limited to the details shown, since various modifications and structural changes may be made without departing from the spirit of my invention.

Without further analysis the foregoing will so fully reveal the gist of my invention that others can by applying current knowledge readily adapt it for various applications without omitting features that, from the standpoint of the prior art, fairly constitute the essential characteristics of the generic or specific aspects of this invention, and, therefore, such adaptations should and are intended to be comprehended within the meaning and range of equivalents of the following claims.

What I claim as new and desire to secure by Letters Patent is:

1. Apparatus for photographing body cavities, comprising in combination, elongated support means having an end portion adapted to be located within a body cavity; an end camera located at the extremity of said end portion of said support means; a side camera mounted within said elongated support means next to said end camera; shutter means movably mounted on said elongated support means and being operatively connected to said cameras for simultaneously exposing film in the same, said shutter means comprising a first tubular shutter member located about said side camera and being mounted for movement on said elongated support means between one position where film in said side camera is covered and another position where film in said side camera is exposed, a second shutter member located in said end camera for movement between one position where film in said end camera is covered and another position where film in said end camera is exposed, spring means operatively connected only to said second shutter member for urging the same toward the other position thereof and an elongated slidably mounted member separate from and located between said first and second shutter member and engaging the same for moving said second shutter member against the action of said spring means into said one position thereof when said first shutter member is moved into said one position thereof; and operating means mounted on said elongated support means and being connected to said first shutter member for moving the latter from said one position to said other position thereof.

2. Apparatus for photographing body cavities, comprising in combination, elongated support means having an end portion adapted to be located within a body cavity; an end camera located at the extremity of said end portion of said support means, said end camera having a side wall portion formed with a slot extending along the length thereof; at least one side camera located within said elongated support means next to said end camera; a tubular shutter member located about said side camera and being mounted for slidable movement along said elongated support means toward and away from said end camera to expose film in said side camera when said tubular shutter member is located in one position away from said end camera and to cover film in said side camera when said tubular shutter member is located in another position next to said end camera, said tubular shutter member having a projection aligned with said slot of said end camera and extending into same when said tubular shutter member is in said other position thereof; a second pivotally mounted shutter member located in said end camera for movement between one position where film in said end camera is exposed and another position where film in said end camera is covered by said second shutter member, said second shutter member having an end portion extending into said slot of said end camera; spring means mounted in said end camera and being operatively connected to said second shutter member for urging the same into said one position thereof; and an elongated strip mounted for sliding movement in said slot of said end camera and being of a greater length than the distance between said projection of said tubular shutter member, when the latter is in said other position thereof, and said end portion of said second shutter member, whereby, when said tubular shutter member is moved from said one position to said other position thereof, said projection of said tubular shutter member engages said strip and moves the same in said end slot of said end camera so that said strip engages said second shutter member and moves the same against the action of said spring means from said one position to said other position thereof.

3. Apparatus for photographing body cavities, comprising in combination, elongated support means having an end portion adapted to be located within a body cavity; an end camera located at the extremity of said end portion of said support means, said end camera having a side wall portion formed with a slot extending along the length thereof; at least one side camera located within said elongated support means next to said end camera; a tubular shutter member located about said side camera and being mounted for slidable movement along said elongated support means toward and away from said end camera to expose film in said side camera when said tubular shutter member is located in one position away from said end camera and to cover film in said side camera when said tubular shutter member is located in another position next to said end camera, said tubular shutter member having a projection aligned with said slot of said end camera and extending into same when said tubular shutter member is in said other position thereof; a second pivotally mounted shutter member located in said end camera for movement between one position where film in said end camera is exposed and another position where film in said end camera is covered by said second shutter member, said second shutter member having an end portion extending into said slot of said end camera; spring means mounted in said end camera and being operatively connected to said second shutter member for urging the same into said one position thereof; and an elongated strip mounted for sliding movement in said slot of said end camera and being of a greater length than the distance between said projection of said tubular shutter member, when the latter is in said other position thereof, and said end portion of said second shutter member, said strip having a bevelled end portion engaging a side of said end portion of said second shutter member, whereby, when said tubular shutter member is moved from said one position to said other position thereof, said projection of said tubular shutter member engages said strip and moves the same in said end slot of said end camera so that said bevelled end portion of said strip engages said side of said end portion of said second shutter member and moves the same against the action of said spring means from said one position to said other position thereof.

4. Apparatus for photographing body cavities, comprising in combination, elongated support means having an end portion adapted to be located within a body cavity; an end camera located at the extremity of said end portion of said support means, said end camera having a side wall portion formed with a slot extending along the length thereof; at least one side camera located within said elongated support means next to said end camera; a tubular shutter member located about said side camera and being mounted for slidable movement along said elongated support means toward and away from said end camera to expose film in said side camera when said tubular shutter member is located in one position away from said end camera and to cover film in said side camera when said tubular shutter member is located in another position next to said end camera, said tubular shutter member having a projection aligned with said slot of said end camera and extending into same when said tubular shutter member is in said other position thereof; a second pivotally mounted shutter member located in said end camera for movement between one position where film in said end camera is exposed and another position where film in said end camera is covered by said second shutter member, said second shutter member having an end portion extending into said slot of said end camera; spring means mounted in said end camera and being operatively connected to said second shutter member for urging the same into said one position thereof; an elongated strip mounted for sliding movement in said slot of said end camera and being of a greater length than the distance between said projection of said tubular shutter member, when the latter is in said other position thereof, and said end portion of said second shutter member, whereby, when said tubular shutter member is moved from said one position to said other position thereof, said projection of said tubular shutter member engages said strip and moves the same in said end slot of said end camera so that said strip engages said second shutter member and moves the same against the action of said spring means from said one position to said other position thereof; and operating means mounted on said elongated support means and being operatively connected to said tubular shutter member and end portion of said elongated support means for moving the same with respect to each other so that said tubular shutter member may thereby be moved between said positions thereof.

5. Apparatus for photographing body cavities, comprising in combination, elongated support means having an end portion adapted to be located in a body cavity; an end camera mounted on the extremity of said end portion of said elongated support means, said end camera having a side wall portion formed with a slot extending along the length thereof; a shutter member mounted within said end camera for pivotal movement between one position where film in said end camera is exposed and another position where film in said end camera is covered and having an end portion located in said slot; spring means mounted within said end camera and being operatively connected to said shutter member for urging the same toward said one position thereof; a sleeve member located adjacent to said end camera and mounted about said elongated support means for slidable movement therealong between one position where said sleeve member is located next to said end camera and another position where said sleeve member is located away from said end camera, said sleeve member having a projection located over an end of said slot and adapted to extend into the same when said sleeve member is moved toward said end camera; an elongated strip of a greater length than the distance between said projection of said sleeve member in said one position thereof and said end portion of said shutter member, having a bevelled end engaging a side of said end portion of said shutter member, and being mounted for sliding movement in said slot for transmitting movement of said sleeve member toward said end camera to said end portion of said shutter member for moving the latter against the action of said spring means to said other position thereof, said shutter member being released to the action of said spring means when said sleeve member is moved away from said end camera; and operating means operatively connected to said sleeve member and located within said elongated support means for moving said sleeve member toward and away from said end camera.

ERNEST J. MARCOUILLER.

References Cited in the file of this patent

UNITED STATES PATENTS

| Number | Name | Date |
|---|---|---|
| 619,792 | Schaaf | Feb. 21, 1899 |
| 1,828,141 | Back | Oct. 20, 1931 |
| 2,258,304 | Stanton | Oct. 7, 1941 |

FOREIGN PATENTS

| Number | Country | Date |
|---|---|---|
| 54,722 | Germany | Dec. 23, 1890 |
| 657,560 | France | Jan. 16, 1929 |